UNITED STATES PATENT OFFICE.

GEORG STEINIKE AND FRIEDRICH SCHMIDT, OF HÖCHST-ON-THE-MAIN, GERMANY, ASSIGNORS TO THE FARBWERKE, VORMALS MEISTER, LUCIUS & BRÜNING, OF SAME PLACE.

BLACK DISAZO WOOL-DYE.

SPECIFICATION forming part of Letters Patent No. 603,093, dated April 26, 1898.

Application filed July 22, 1893. Serial No. 481,222. (Specimens.) Patented in Germany November 6, 1891, No. 73,170, and May 16, 1893, No. 79,644.

*To all whom it may concern:*

Be it known that we, GEORG STEINIKE and FRIEDRICH SCHMIDT, doctors of philosophy, citizens of the Empire of Germany, residing at Höchst-on-the-Main, in the Empire of Germany, have invented certain new and useful Improvements in the Production of Coloring-Matters, (for which Letters Patent were granted in Germany by and with our consent to the Farbwerke, vormals Meister, Lucius & Brüning, No. 73,170, of 1891, and No. 79,644, of 1893;) and we do hereby declare the following to be a full, clear, and exact description of the invention, such as will enable others skilled in the art to which it appertains to make and use the same.

Our invention relates to the production of black disazo dyestuffs for wool by the action of two molecules of a diazo compound upon one molecule of dioxynaphthalene sulfonic acid S of United States Letters Patent No. 444,679. This acid possesses, as we have found, the ability to combine in an alkaline or acid-and-alkaline solution with two molecules of a diazo compound. Among the most valuable of the numerous possible combinations are to be considered those in which one of the two diazo compounds is a naphthylaminmonosulfonic acid.

To produce such dyestuffs, we proceed, for instance, as follows: 2.62 kilograms of dioxynaphthalenesulfonate of sodium S are, together with 2.2 kilograms of calcined soda in water, brought to a solution of ten to fifteen per cent. 2.23 kilograms of naphthionic acid are diazotized in the usual way and run into the alkaline-soda solution of dioxynaphthalenesulfonic acid S at about 5° centigrade and stirred for six hours. After this time the violet-red monoazo dyestuff is formed. 4.4 kilograms of calcined soda, or preferably 1.6 kilograms of caustic sodium, are added. Then under good stirring an alpha-diazonaphthalene solution obtained in the usual manner from 1.43 kilograms of alpha-naphthylamin is slowly run in at a temperature of 0° centigrade. After a lapse of twelve hours the formation of the disazo dyestuff is complete.

The dyestuff is separated from the solution in the usual manner with common salt. It forms in a solid form a dark powder of bronze-like luster, is easily soluble in water with a violet color, and soluble with difficulty in alcohol with a reddish-blue color. The aqueous solution turns redder on addition of ammonia. The solution in concentrated sulfuric acid separates, on the addition of water, the dyestuff as a reddish-violet precipitate.

The dyestuff dyes wool in an acid-bath bluish black and produces on chrome-mordants a deep black.

The formation of the dyestuff may be illustrated by the following equations:

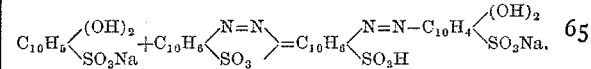

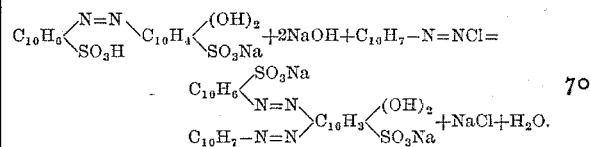

The process may also be carried out by first combining dioxynaphthalenesulfonic acid S with diazotized alpha-naphthylamin and by subsequently allowing the diazotized naphthylaminsulfonic acid to act upon the monoazo dyestuff formed.

Having thus described our invention, we claim as new and desire to secure by Letters Patent—

1. The process herein described of producing black disazo dyestuffs for wool of the general constitution:

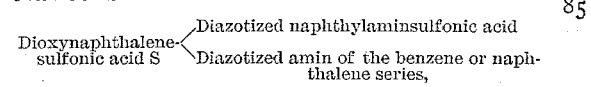

by the action of one molecule of a diazotized naphthylaminsulfonic acid and one molecule of a diazotized amin of the benzene or naphthalene series upon one molecule of dioxynaphthalenemonosulfonic acid S of the United States Patent No. 444,679, substantially as described.

2. As new products, the black disazo dyestuffs for wool, obtained by the action of one molecule of a diazotized alpha-naphthylaminsulfonic acid and one molecule of a diazotized amin upon one molecule of dioxynaphthalenesulfonic acid S of the United States Patent No. 444,679, being dark powders of bronze-like luster, soluble in water with a violet color, insoluble in benzene, soluble in concentrated sulfuric acid, and dyeing wool black in an acid-bath, substantially as set forth.

3. As a new product, the dyestuff obtained by the action of one molecule of diazotized naphthionic acid and one molecule of diazotized alpha-naphthylamin upon one molecule of dioxynaphthalenesulfonic acid (1:8:4) having the formula:

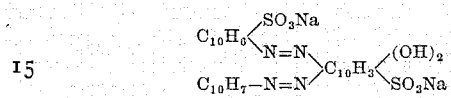

and forming a dark powder of bronze-like luster, easily soluble in water with a violet color, soluble with difficulty in alcohol with a reddish-blue color and insoluble in benzene, the aqueous solution of which turns redder on addition of ammonia, while in concentrated sulfuric acid the dyestuff is soluble with a pure-blue color and is separated on addition of water as a reddish-violet precipitate, and dyes wool blue-black in an acid-bath, substantially as set forth.

In testimony whereof we affix our signatures in presence of two witnesses.

GEORG STEINIKE.
FRIEDRICH SCHMIDT.

Witnesses:
JOSEF REVERDY,
HEINRICH HAHN.